United States Patent
Fuchs et al.

[15] 3,683,174
[45] Aug. 8, 1972

[54] LIGHT SOURCE REFLECTOR SUPPORT

[72] Inventors: Bernard Fuchs, L'Hay-Les-Roses; Christian Gary, Versailles, both of France

[73] Assignee: Compagnie Generale D'Electricite, Paris, France

[22] Filed: June 14, 1968

[21] Appl. No.: 737,126

[30] Foreign Application Priority Data

June 16, 1967 France..........................110630

[52] U.S. Cl. ..............240/103, 240/11.4, 240/51.11, 331/94.5
[51] Int. Cl. .............................F21v 7/14, H01s 3/02
[58] Field of Search ......277/177; 331/94.5; 240/11.4

[56] References Cited

UNITED STATES PATENTS

| | | | |
|---|---|---|---|
| 2,386,873 | 10/1945 | Mercier | 277/177 |
| 2,968,501 | 1/1961 | Tisch | 277/177 |
| 3,124,307 | 3/1964 | Hoskins et al. | 240/11.4 |
| 3,136,489 | 6/1964 | Oharenko | 240/11.4 |
| 3,242,440 | 3/1966 | Koester et al. | 331/94.5 |
| 3,262,070 | 7/1966 | Reuter et al. | 331/94.5 |
| 3,262,071 | 7/1966 | Reuter et al. | 331/94.5 |
| 3,358,167 | 12/1967 | Shanks | 240/11.4 |
| 3,388,915 | 6/1968 | Dega | 277/177 |
| 2,887,567 | 5/1959 | Dameral | 240/51.11 |
| 3,162,373 | 12/1964 | Biggs et al. | 240/1.2 |
| 3,211,491 | 10/1965 | Browne | 296/28 |
| 3,397,856 | 8/1968 | Sullivan | 248/22 |
| 3,499,255 | 3/1970 | Sweeney | 52/263 |

*Primary Examiner*—Richard C. Queisser
*Assistant Examiner*—C. E. Snee, III
*Attorney*—Sughrue, Rothwell, Mion, Zinn & Macpeak

[57] ABSTRACT

A tubular light source reflector for the optical pumping of solid-state lasers is provided with a mounting ring molded directly on the outer surface of the reflector. A flexible plastic ring may be simultaneously molded around the mounting ring. The present invention relates to a light source reflector, more particularly for the optical pumping of solid-state lasers.

6 Claims, 3 Drawing Figures

PATENTED AUG 8 1972　　3,683,174

LIGHT SOURCE REFLECTOR SUPPORT

There are known, more particularly in solid-state lasers, light source reflectors for optical pumping which are made either of glass or quartz and mounted and guided within protective envelopes by metallic or plastic centering rings. However, such constructions have disadvantages, notably by reason of the fact that the walls of the reflector are not plane and that the fluid tightness is ensured only by external elements such as toroidal packings. In addition, such an arrangement is insufficiently flexible for use in many applications, notably in experimental solid-state lasers.

The present invention has for its object notably to obviate the aforesaid disadvantages, and relates to a light source reflector which is intended to be mounted in a protective envelope, more particularly for the optical pumping of solid-state lasers, characterized in that it is provided with a ring obtained by direct molding on at least one part of the outer wall of the reflector, serving for guiding said reflector in said protective envelope and ensuring complete fluid tightness between said ring and said reflector.

The molding effected on at least one part of the external wall of the reflector is performed by a series of operations: a first operation consisting in casting a resin containing a catalyst in a cavity defined by the inside walls of a mold and the outside walls of the reflector, a second operation consisting in effecting the polymerization of the resin at elevated temperature, and a third operation consisting in removing the aforesaid mold in the cold condition.

Further features of the invention will become apparent from the following description, which is given with reference to the accompanying drawings.

DETAILED DESCRIPTION OF THE INVENTION

Figure 1:
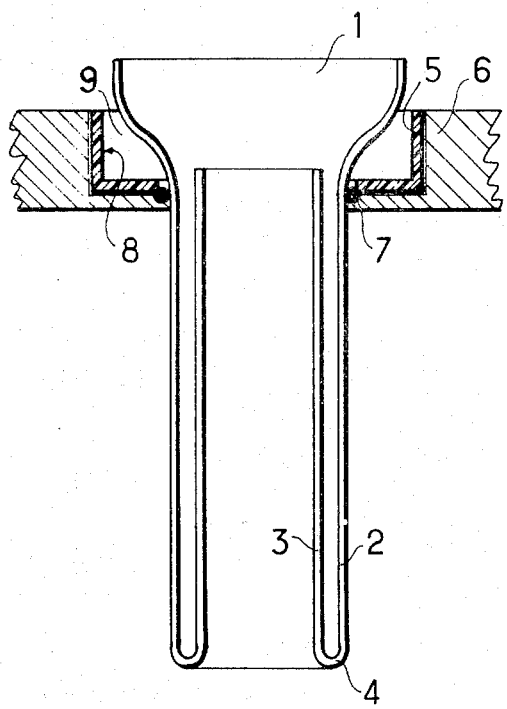
FIG. 1 illustrates in section a reflector disposed in a mold in a phase preceding the molding operation.

FIG. 1, which shows a reflector disposed in a mold illustrates the preliminary phase preceding the molding according to the invention. The reflector 1, which comprises two tubes 2 and 3 bent over to form a closed end 4, is centered in a mold 6. An auxiliary ring 5 is disposed against the mold 6, defining a cavity 9 with a portion of the outside wall of the tube 2. The auxiliary ring 5 will preferably be made of a flexible material, for example of a thermally stable plastic material, and the mold 6 will be made of any metal.

A packing 7 adapted to withstand a temperature of at least 100° C. is disposed between the auxiliary ring 5 and the mold 6 against the outside wall of the tube 2, so as to ensure fluid-tightness between said ring 5 and the mold. The packing 7 will be, for example, a silicone-based toroidal packing.

The inside faces of the cavity 9 previously cleaned, either with a product such as acetone or trichloroethylene, or by general sanding of the element, are coated with a fine dressing layer indicated at 8, for example a fine layer of a product known under the reference SI A 4082 of Societe des Silicones, which is intended to promote the adherence of the molding to the ring 5 and the reflector.

The molding operation, which is not illustrated in the drawings, comprises a number of phases. In a first phase, a mixture of resin and of a catalyzing product is cast in the cavity 9, for example by means of a hypodermic syringe. In a second phase, the whole element obtained from the first phase is disposed in an oven and heated at a temperature between 60° and 100° C. for a period of 6 to 3 hours, so that the resin of the molding polymerizes. The mixture constituting the molding may consist, in a first example, of a mixture of a resin, such as that known under the reference S$i$ 182 of Societe des Silicones, with a catalyst, such as that known under the reference XY 28 of the same company, by means of which it is possible to obtain a first type of molding of constant hardness, or in a second example, of a mixture of two products, known under the trade mark "Araldite" registered by CIBA, and marketed by Societe Prochal under the references CY 220 and CY 221, and containing a catalyst, such as that known under the reference HY 952 of Societe Prochal, by means of which it is possible to obtain a second molding whose hardness coefficient varies as a function of the proportion of the aforesaid products contained therein.

Figure 2:
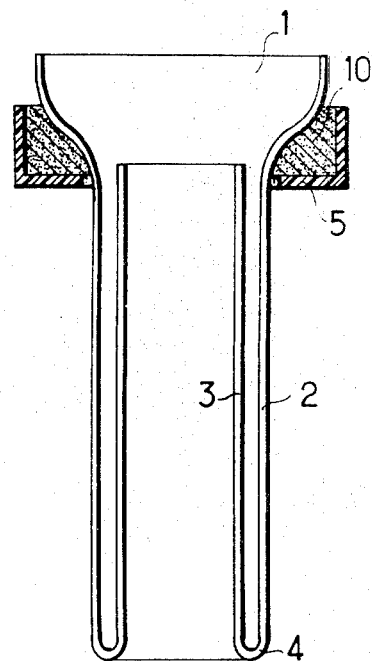
FIG. 2 illustrates in section a reflector provided with a guide ring according to the invention.

FIG. 2 illustrates in section a reflector provided with a guide ring according to the present invention. The assembly obtained after the molding operation is allowed to cool and the mold 6, illustrated in FIG. 1, is separated from said guide ring, so as to obtain a reflector 1 provided with a guide ring 10 and outer auxiliary ring 5, the ring 10 having very good adherence to the walls of the tube 2 and of the auxiliary ring 5.

Figure 3:
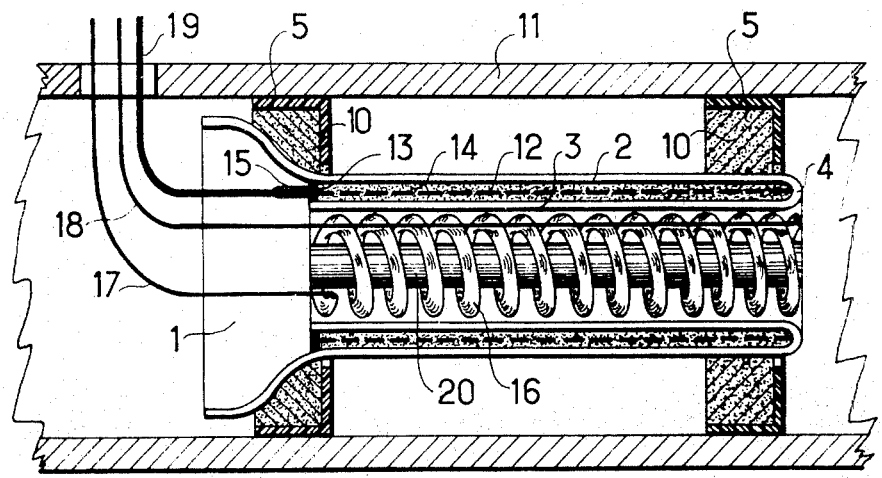
FIG. 3 illustrates in section a reflector in a protective envelope.

FIG. 3 illustrates in section a reflector according to the invention in a protective envelope, together with various elements constituting a solid-state laser head. The reflector 1 provided with two guide rings 10 between the walls of the tube 2 and two auxiliary rings 5 is mounted in an enclosure 11 serving as a protective envelope, which consists of a light alloy, for example an aluminum alloy containing 5 percent magnesium. The rings 10 serve to guide the reflector 1 within the envelope 11.

Disposed in the interior of the two tubes 2 and 3 is a grid 12, for example of copper, the gaps between the walls of the tubes 2 and 3 being filled, for example, with fine magnesia powder 14 tamped to have a good distribution in the said gap. A plug 13 consisting of a resin seals the end of the gap between the tubes 2 and 3 containing the grid 12 and magnesia 14, and is formed with an aperture for the fluid-tight passage of an electrode 19 connected to said grid through a sleeve 15. The grid 12 represents the circuit for triggering or initiating the ionization of the gas contained in a helical tube 16 connected to two electrodes 17 and 18, respectively. A solid rod 20, for example of ruby or neodymium-doped glass, is disposed within the helical tube 16 to which it is secured.

Such an arrangement affords many advantages, notably:

the guide ring 10 permits centering of the reflector on the axis of the rod 20, since the helical tube is fast with the reflector, the ring 10 also serves to center the said tube 16 on the axis of the rod, the fluid-tightness can readily be ensured by virtue of the fact that the molding constituting the ring 10 for guiding the reflector in the protective envelope 11 is directly bonded to the reflector 1, the auxiliary ring 5 consisting of flexible material enables it to adapt itself to the irregularities of the surface of the envelope, the guide ring 10 makes it possible to avoid danger of sparking between the metal rings and the triggering circuits.

In addition, since the reflectors are mounted on solid-state laser heads of standard type, it is possible to provide identical auxiliary rings such as 5 for all types of reflectors, which are generally cylindrical but of variable external diameter, the space between the said auxiliary ring and the reflector being filled with the mixture employed for the molding for the assembly of the elements.

While the invention has been particularly shown and described with reference to a preferred embodiment thereof, it will be understood by those skilled in the art that various changes in form and details may be made therein without departing from the spirit and scope of the invention.

What is claimed is:

1. A reflector device suitable for mounting in a tubular housing comprising a tubular reflector element having an irregular surface configuration in part, at least one annular support element molded to the external irregular surface of said reflector element and having external peripheral surface means adapted to cooperate with the internal surface of a tubular housing to locate the reflector element at the desired position in the housing.

2. A reflector device as set forth in claim 1 wherein said annular support element is comprised of an internal portion of relatively hard material molded directly to the external irregular surface of the reflector element and an external portion of relatively soft material integrally molded to the internal portion to define said peripheral surface means adapted to at least partially compensate for irregularaties in the internal surface of the housing.

3. A reflector device as set forth in claim 2 wherein said internal portion of said annular support element includes at least one polymerized resin.

4. A reflector device as set forth in claim 2 wherein said external portion of said support element includes a plastic material.

5. A reflector device as claimed in claim 1 wherein said reflector element is comprised of two coaxial tubes integral with one another at one end thereof and defining therebetween an annular space.

6. A laser comprising a tubular housing, a reflector element having an irregular surface configuration coaxially disposed within said housing, an annular support element molded to the external irregular surface of said reflector element and having external peripheral surface means cooperating with the internal surface of said housing to locate the reflector element at the desired position within said housing, a helical flash tube mounted coaxially within said reflector element and a laser rod mounted coaxially within the helix of the flash tube.

* * * * *